United States Patent
Kono et al.

(10) Patent No.: US 6,721,019 B2
(45) Date of Patent: Apr. 13, 2004

(54) SCREEN INPUT TYPE DISPLAY DEVICE

(75) Inventors: Masao Kono, Mutsuzawa (JP); Akira Kakinuma, Chiba (JP); Koji Ishii, Chosei (JP); Haruhisa Otsuka, Mobara (JP); Kazuo Ishii, Mobara (JP)

(73) Assignees: Hitachi, Ltd., Tokyo (JP); Hitachi Device Engineering Co., Ltd., Mobara (JP); Hitachi Chiba Electronics, Ltd., Sakura (JP)

( * ) Notice: Subject to any disclaimer, the term of this patent is extended or adjusted under 35 U.S.C. 154(b) by 270 days.

(21) Appl. No.: 09/838,213

(22) Filed: Apr. 20, 2001

(65) Prior Publication Data

US 2001/0043291 A1 Nov. 22, 2001

(30) Foreign Application Priority Data

May 17, 2000 (JP) .......................... 2000-144708
Mar. 2, 2001 (JP) .......................... 2001-058619

(51) Int. Cl.⁷ .............................................. G02F 1/335
(52) U.S. Cl. ........................... 349/12; 349/23; 349/24; 349/58; 349/156; 349/158; 349/162; 349/122
(58) Field of Search .............................. 349/12, 23, 24, 349/58, 156, 158, 162, 122, 117

(56) References Cited

U.S. PATENT DOCUMENTS 5,193,668 A   3/1993  Fukuchi et al.

FOREIGN PATENT DOCUMENTS

| JP | 0400953 | 5/1990 | .......... H01H/13/70 |
| JP | 3156818 | 7/1991 | .......... H01H/13/70 |
| JP | 04-012421 | 1/1992 | |

*Primary Examiner*—Nathan J. Flynn
*Assistant Examiner*—Fazli Erdem
(74) *Attorney, Agent, or Firm*—Antonelli, Terry, Stout & Kraus, LLP

(57) ABSTRACT

There is provided a highly reliable screen input type display device using a touch panel which can facilitate the control of a gap formed between upper and lower substrates and can stabilize the linearity of the resistance value detection of a resistance film, whereby an erroneous detection of coordinated can be eliminated. For this purpose, a tape-like conductive pressure sensitive adhesive member, which is formed by sandwiching a metal foil with conductive pressure sensitive adhesive material, is used at a connection portion between an upper wiring electrode mounted on an upper resistance film formed on an upper substrate and an inter-substrate connection wiring electrode formed on a lower substrate.

20 Claims, 14 Drawing Sheets

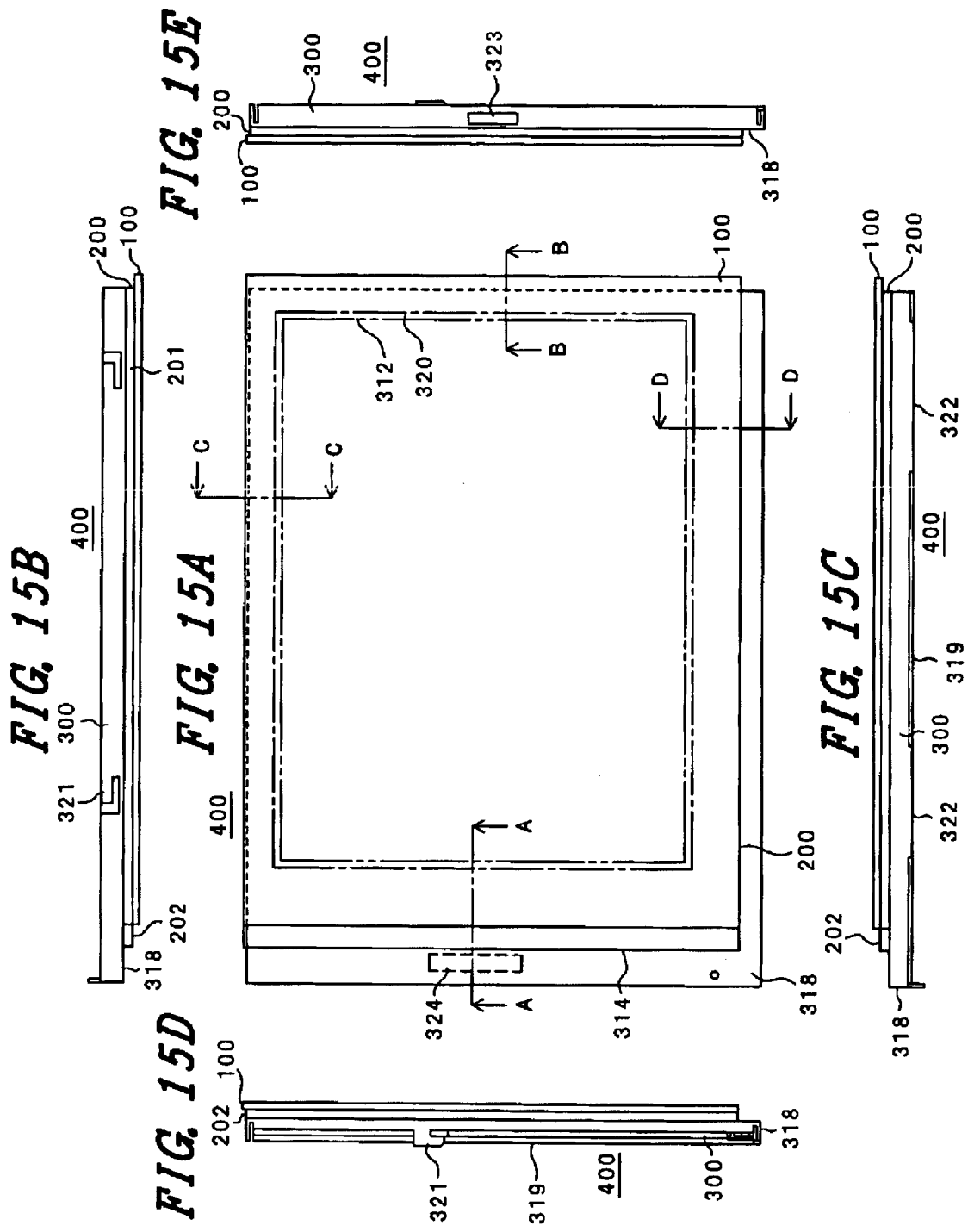

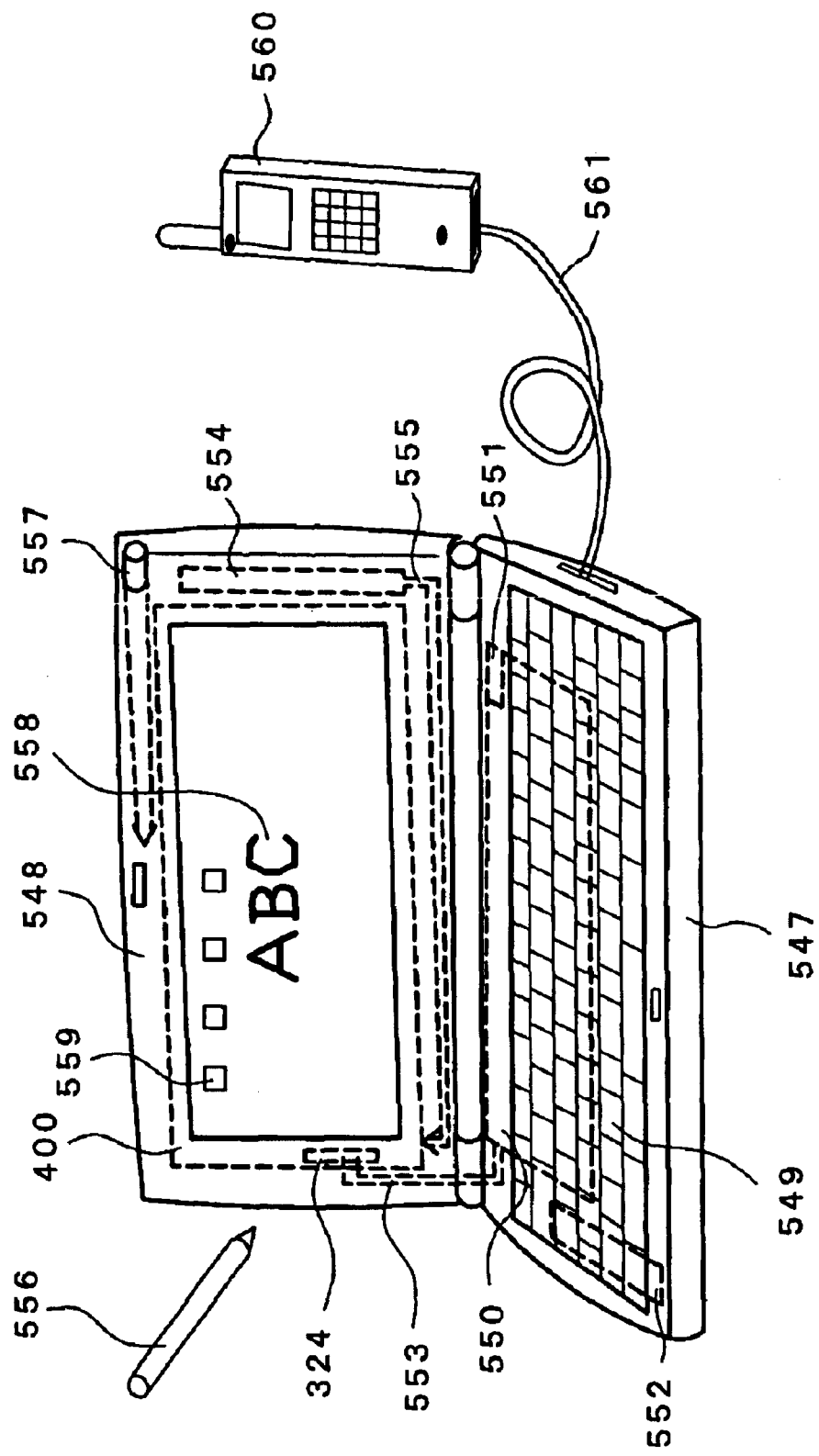

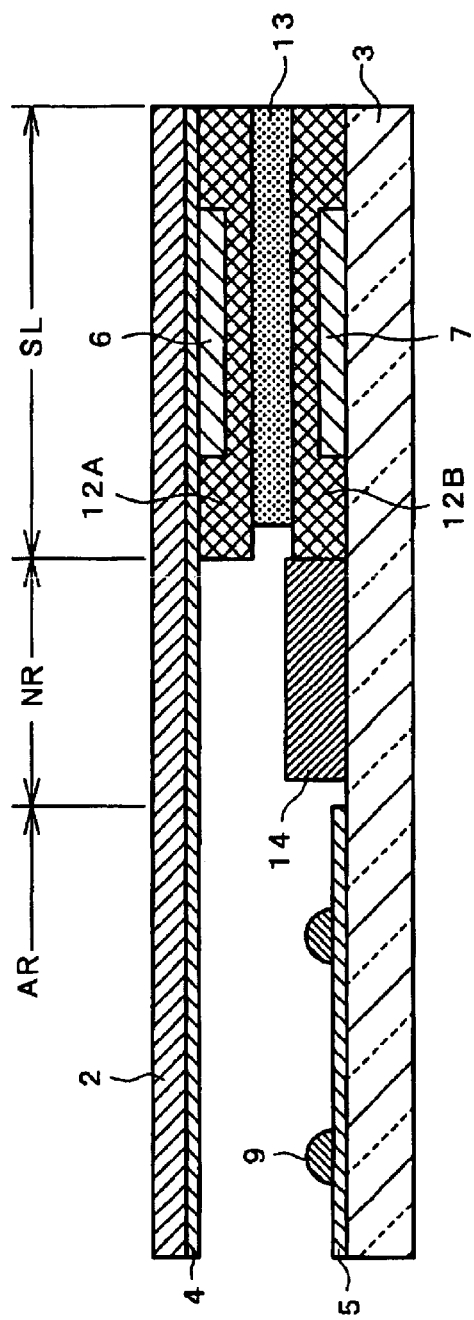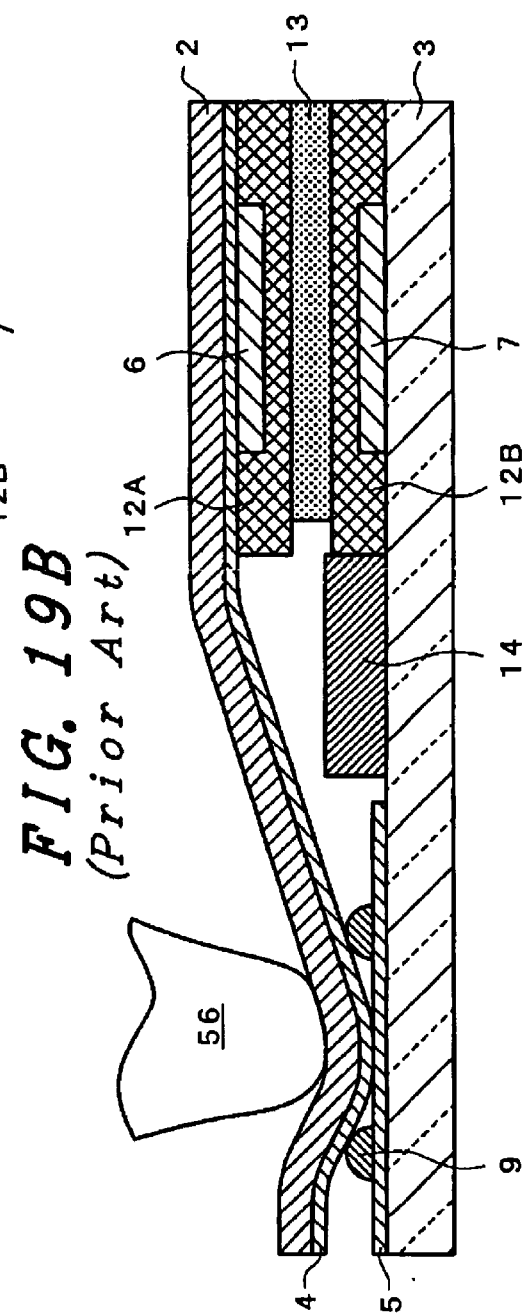

SCREEN INPUT TYPE DISPLAY DEVICE

BACKGROUND OF THE INVENTION

The present invention relates to a screen input type display device having a construction in which a touch panel, which detects input coordinates based on a change of resistance produced by a push manipulation, is laminated on a display device.

As an example, it is known to use a liquid crystal display device as a display means in a personal computer or as another type of monitor. This type of display device irradiates illumination light to form images on a liquid crystal panel, and it visualizes the images by irradiating transmitting light or reflection light to a display surface side.

In general, a screen input type display device which adopts this type of liquid crystal display uses a liquid crystal panel which sandwiches a liquid crystal layer in a space defined between a pair of laminated substrates having pixel selecting electrodes and the like, and it can generate images by changing the orientation state of liquid crystal molecules corresponding to selected pixel portions. Since the generated image per se is not in the visible state, the liquid crystal panel is irradiated by applying light from the outside, and transmitting light or reflection light therefrom is observed as the image.

Recently, an information terminal, which uses this type of liquid crystal display device as a display means and is provided with a touch panel, which is laminated on a screen of the liquid crystal display device and inputs various information through the screen by a push manipulation, has been widely used.

Although there exist touch panels for various systems depending on the operating principles thereof, the most popular touch panel is one which adopts a system in which input coordinates are detected depending on a change in the quantity of resistance, i.e. a so-called "analogue resistance film system".

In this touch panel based on an analogue resistance film system, one substrate, which forms an information input side, is constituted of a soft film, such as a transparent plastic sheet or the like, while the other substrate is constituted of a transparent hard plate, preferably made of glass, and the resistance films are respectively provided on opposing surfaces of the two transparent substrates. With such a construction, a two dimensional coordinate value is detected based on the resistance value between the resistance films of the respective substrates, which are brought into contact with each other in response to the push manipulation applied from one substrate side, and an output terminal.

FIG. 18 is a schematic cross-sectional view illustrating an example of an overall constitution of a screen input type display device which constitutes a display device provided with a touch panel. This display device is constituted by laminating a touch panel 100 on a liquid crystal panel 300. Although the illustrated display device is of a type which inserts an auxiliary light source device 200 between the liquid crystal panel 300 and the touch panel 100, a display device which mounts the auxiliary light source device on a side opposite to a display screen of the liquid crystal panel 300, or a display device which is not provided with an auxiliary light source device has been commercialized. In the drawing, numeral 202 indicates a lamp which constitutes an element of the auxiliary light source device 200 and numeral 203 indicates a lamp reflection sheet which also constitutes an element of the auxiliary light source device 200.

FIG. 19A and FIG. 19B are schematic cross-sectional views illustrating the constitution and the state at the time of push manipulation of an essential part of a signal input side of the touch panel shown in FIG. 18, respectively. Although the upper substrate is referred to as a first substrate and the lower substrate is referred to as a second substrate for facilitating the explanation, these substrates may be arranged up side down.

In FIG. 19A and FIG. 19B, numeral 2 indicates an upper substrate made of a transparent film, such as plastic or the like, and numeral 3 indicates a lower substrate made of a hard plate, such as a glass plate. On inner surfaces of these two substrates 2, 3, an upper resistance film 4 and a lower resistance film 5, which are respectively preferably made of ITO, are formed as a coating. Further, in an input region AR of the lower resistance film 5, which is formed on the lower substrate 3, dot-like spacers 9 which prevent upper and lower resistance films 4, 5 from coming into contact with each other in the non-input manipulation state are formed. The spacers 9 are formed by printing using a mask having given apertures, or a photolithography technique or the like using a photosensitive resin.

In an adhesion region (seal region) SL, which is located at an outermost periphery of the touch panel, the upper resistance film 4 is electrically connected to an upper wiring electrode 6, which is formed on the upper resistance film of the upper substrate, and an inter-substrate connection wiring electrode 7, which is formed on the lower substrate. The inter-substrate connection wiring electrode 7 is connected to a coordinate recognition circuit disposed outside by an outgoing line (generally, a flexible printed circuit board: FPC), which is not shown in the drawing, by way of a pull-around wiring, which is also not shown in the drawing. The lower resistance film 5, which is formed on the lower substrate 3, is connected to a lower wiring electrode, which is not shown in the drawing, and the lower resistance film 5 is connected to the outgoing line by way of a pull-around wiring, which is not shown in the drawing and is formed on the inner surface of the lower substrate 3.

The upper wiring electrode 6 and the inter-substrate connection wiring electrode 7 are respectively coated with protective films (insulation films) 12A, 12B, and these protective films are adhered to each other by means of a seal agent (adhesive agent or adhesive sheet) 13.

Toward the inside from the seal region SL, the input region AR is positioned by way of an inoperable region NR. The inoperable region NR is a portion which becomes insensitive at the time of performing the push input manipulation. As shown in FIG. 19B, this inoperable region NR corresponds to an input invalidation space which is formed when the upper substrate 2 is deflected toward the lower substrate 3 upon receiving the pressure of a nib 56, which constitutes an input means.

In general, in this inoperable region NR, an inoperable region forming member 14 is provided to prevent an input failure of information by the push input manipulation of the nib 56. That is, the inoperable region forming member 14, which has a size that ensures the entrance of the nib 56 in the input region AR in the state shown in FIG. 19B and is made of a transparent insulation material, is provided to the inoperable region NR.

FIG. 20 is a schematic cross-sectional view illustrating the constitution of an essential part of a connection portion between the upper wiring electrode 6 and the inter-substrate connection wiring electrode 7 of the touch panel. The upper wiring electrode 6 formed on the upper resistance film 4 on the inner surface of the upper substrate 2 and the inter-substrate connection wiring electrode 7 formed on the inner surface of the lower-substrate 3 are electrically connected with each other by way of an adhesive agent 14 made of epoxy resin in which metal particles are mixed.

In the conventional screen input type display device provided with a touch panel having such a constitution, conductive thin films made of silver paste or the like, which are coated on the upper and lower wiring connection portions, and an adhesive agent in which the metal particles are mixed are used; hence, when a gap between the upper and lower substrates is set to approximately 40 $\mu$m to 150 $\mu$m, it is difficult to control such a gap. When the gap between the upper and lower substrates is not uniform, a user has an uncomfortable feeling at the time of performing a push manipulation. This is one of problems to be solved by the present invention.

Further, since the adhesive agent 14, in which the metal particles are mixed, is used for the connection between the upper wiring electrode 6, formed on the upper resistance film 4 of the upper substrate 2, and the inter-substrate connection wiring electrode 7, formed on the lower substrate 3, irregularities are liable to be generated in the connection resistance, and it is difficult to stabilize the linearity of the detected resistance value. This brings about an erroneous operation. To reduce the occurrence of this erroneous operation, the load which a coordinate detection circuit must bear becomes large. This also has been a problem to be solved for enhancing the reliability of the screen input type display device.

SUMMARY OF THE INVENTION

Accordingly, it is an object of the present invention to provide a screen input type display device using a touch panel having a high reliability, which can solve the above-mentioned problems of the prior art, can easily perform gap control between upper and lower substrates, can stabilize the linearity of the resistance value detection with the use of the resistance films and can eliminate erroneous operation in the course of coordinate detection.

To achieve the above-mentioned object, for establishing the connection between a wiring electrode connected to a resistance film of a first substrate and an inter-substrate connection wiring electrode formed on a second substrate, the present invention adopts a planar (or tape-like) structural body which sandwiches a metal foil between conductive pressure sensitive adhesive agents, that is, a conductive pressure adhesive member in which conductive pressure sensitive adhesive agents are coated on both surfaces of a metal foil. The resistance film of the first substrate may be directly brought into contact with the conductive pressure sensitive adhesive member without interposing a wiring electrode therebetween.

Further, as conductive material contained in the conductive pressure sensitive adhesive agent, metal particles preferably made of copper particles or alternatively plastic particles or glass particles, which have a metal plating made of nickel, gold or other metal formed on the surface thereof, can be used.

With the use of the structural body having such a constitution, since the resistance film of a first substrate, or the wiring electrode which is connected to the resistance film, and the inter-substrate wiring electrode formed on the second substrate are electrically connected by a face contact, a stability of the contact resistance is achieved. Accordingly, the linearity of the resistance value detection is improved, so that erroneous coordinate detection can be obviated, and the load that a coordinate detection circuit must bear can be reduced.

Further, according to the constitution of the present invention, by changing the thickness of the metal foil, the gap between the first substrate and the second substrate (upper and lower substrates) can be arbitrarily, accurately and uniformly controlled, and the input feeling can be enhanced.

The present invention adopts a structural body (conductive pressure sensitive adhesive member) which is formed by coating pressure sensitive adhesive material, in which metal particles are mixed, on one surface of a metal foil, and coating pressure sensitive adhesive material, in which conductive particles formed by applying a metal plating on surfaces of plastic particles or conductive particles formed by applying a conductive metal plating on surfaces of glass particles, are mixed on the other surface of the metal foil.

Then, the above-mentioned one surface is made to face the first substrate in an opposed manner, and the other surface is made to face the second substrate in an opposed manner. Due to such a constitution, by making use of a collapsing or embedding of the conductive particles, the direct contact area between the conductive particles and the conductive pressure sensitive adhesive members formed on the inner surface of either one or the other substrate, or between the conductive particles and the resistance films, can be increased. Here, the formation of the wiring electrode on the first substrate side can be omitted. Further, by directly embedding the conductive particles into the wiring electrode or the resistance film formed on the inner surface of one substrate, the direct contact area can be increased and the gap can be accurately set.

The above-mentioned one substrate and the other substrate respectively constitute the first substrate and the second substrate, and either one of these substrates constitutes an input-side substrate, that is, an upper substrate of a touch panel, which becomes a product or a substrate opposite to the input-side substrate, that is, a lower substrate of the touch panel.

As a display device used as a screen input type display device according to the present invention, a liquid crystal display device which uses a liquid crystal panel of a so-called "passive matrix type", "active matrix type" or other known type can be used. Further, the present invention is not limited to the reflection-type liquid crystal display device and is applicable to a transparent-type or a semitransparent/reflection type liquid crystal display device. Further, the present invention is not limited to the liquid crystal display device and is applicable to other display devices.

The constitution of the screen input type display device of the present invention, which laminates the touch panel, is not limited to the constitution specifically described in "what is claimed is" and the constitutions of embodiments which will be explained later. That is, the constitution of the screen input type display device of the present invention is also applicable to any conductive connection between a first substrate and a second substrate of a touch panel in a system which detects coordinates based on the change of capacity between the first and second substrates or change of another electric quantity or of a digital system. In this manner, various modifications are conceivable without departing from the technical concept of the present invention.

BRIEF DESCRIPTION OF THE DRAWINGS

FIG. 15A–FIG. 15E are views of the outer appearance of the screen input type display device of the present invention, as viewed from five directions;

FIG. 17 is a perspective view showing one example of an information processing device which uses the screen input type display device of the present invention;

FIG. 19A and FIG. 19B are schematic cross-sectional views showing the constitution of an essential part of a signal output side of the touch panel shown in FIG. 18 and the state of the touch panel at the time of performing a push manipulation, respectively;

DESCRIPTION OF THE PREFERRED EMBODIMENTS

The modes for carrying out the invention will be explained in detail hereinafter in conjunction with various embodiments, in which an analogue type touch panel which detects a change of resistance is described as an example.

Figure 1:
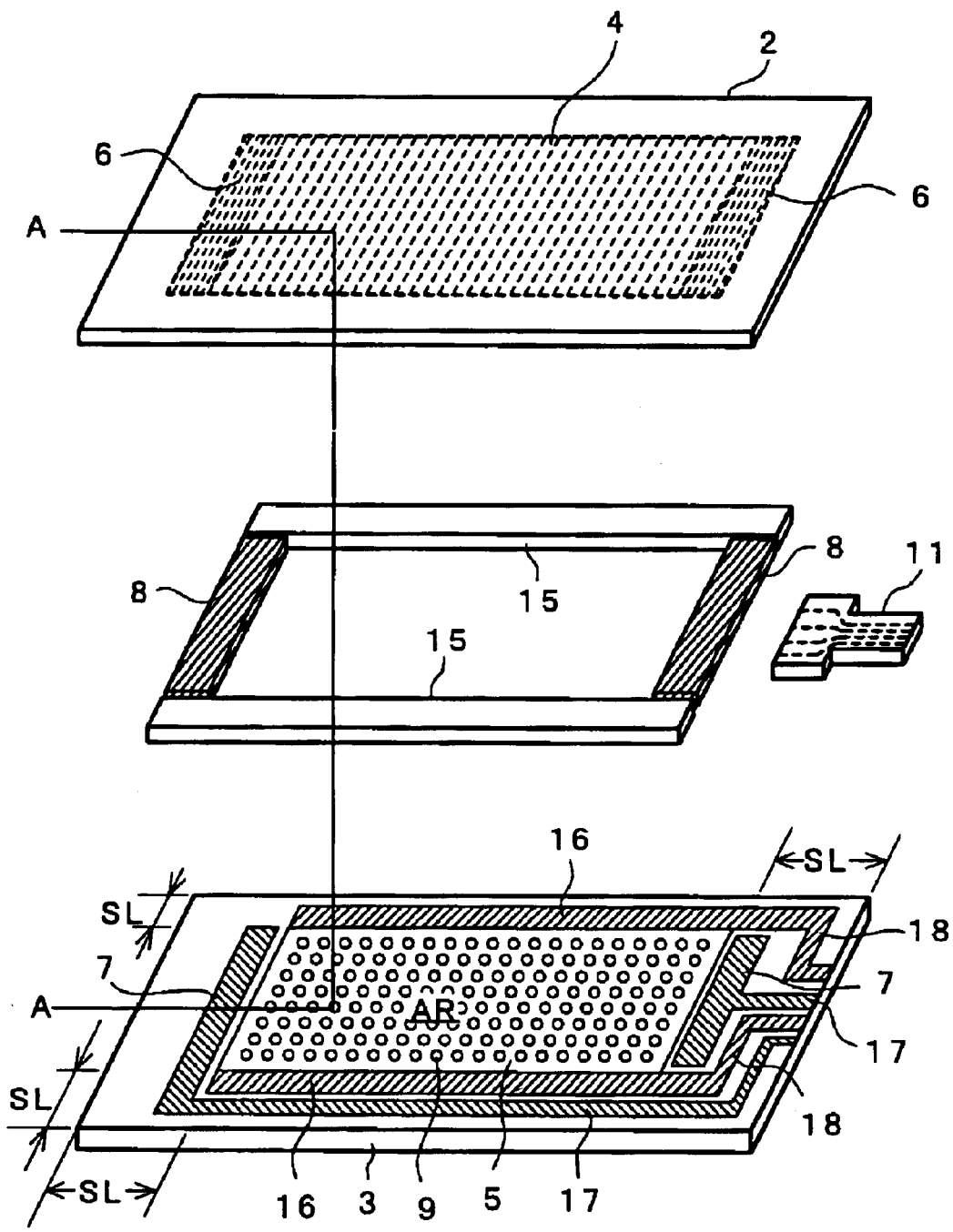
FIG. 1 is an exploded perspective view showing the overall constitution of a first embodiment of a touch panel which constitutes a screen input type display device according to the present invention.
Figure 2:
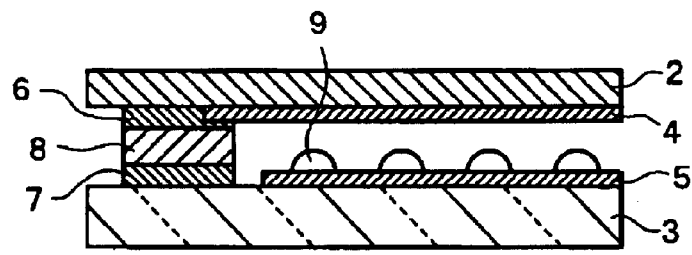
FIG. 2 is a cross-sectional view taken along a line A—A of FIG. 1.

FIG. 1 is an exploded view showing overall constitution of a first embodiment of a touch panel which constitutes a screen input type display device of the present invention. Further, FIG. 2 is a cross-sectional view taken along a line A—A of FIG. 1.

On inner surfaces of a first substrate 2 (hereinafter called the "upper substrate") made of polyethylene telephthalate (PET) film and a second substrate (hereinafter called the "lower substrate") 3 made of glass, a first resistance film (hereinafter called an "upper resist film") 4 made of ITO (Indium Tin Oxide) and a second resistance film (hereinafter called a "lower resistance film") 5 are respectively formed as a coating.

In an input region AR of a lower resistance film 5 formed on the lower substrate 3, dot-like spacers 9 which prevent the upper and lower resistance films 4, 5 from coming into contact with each other in a non-input manipulation state (ordinary state) are formed. These spacers 9 are formed by printing using a mask having given apertures or by a photolithography technique using a photosensitive resin or the like. The interval between spacers 9 is set to be greater than the width of a nib which constitutes a pressing or input means.

The upper resistance film 4 is electrically connected to an upper wiring electrode 6, which is formed by printing or the like in a seal region SL and is preferably made of a silver paste, while the upper wiring electrode 6 is electrically connected to an inter-substrate connection wiring electrode 7 through a conductive pressure sensitive adhesive member 8. This inter-substrate connection wiring electrode 7 is pulled around by means of an inter-substrate connection wiring electrode pull-around wiring 17 formed on the lower substrate 3 to a side (output side) where an FPC 11 is adhered with pressure and is connected to a coordinate recognition circuit disposed outside through an outgoing line carried by the FPC 11.

In the seal region disposed at a side opposite to the side (output side) where the FPC 11 is formed, the conductive pressure sensitive adhesive member 8 is interposed between the upper wiring electrode 6 and the inter-substrate connection wiring electrode 7, so that the upper wiring electrode 6 and the inter-substrate connection wiring electrode 7 are electrically connected with each other by bridging, and the upper and lower substrates are On the other hand, lower wiring electrodes 16 are respectively provided along both side portions of the lower resistance film 5 formed on the inner surface of the lower substrate 3 and are respectively pulled around toward the output side through lower wiring electrode pull-around wiring 18. The upper resistance film 4 is formed such that it terminates in front of positions where the upper resistance film 4 and the lower wiring electrodes 16 are superposed. Accordingly, they are electrically insulated from each other.

Figure 3:
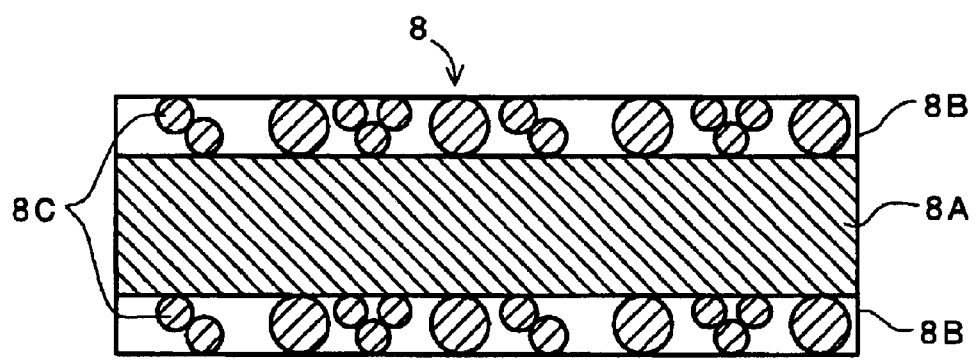
FIG. 3 is a schematic cross-sectional view showing a first example of a conductive pressure sensitive adhesive member formed in a seal region of the first embodiment of the present invention.

FIG. 3 is a schematic cross-sectional view showing a first example of the conductive pressure sensitive adhesive member provided in the seal region in the first embodiment of the present invention. This conductive pressure sensitive adhesive member 8 is formed by coating pressure sensitive adhesive material 8B, in which conductive particles 8C are mixed, on both surfaces of a metal foil 8A. Although a low-resistance metal, such as a copper foil, aluminum foil or the like, can be used as the metal foil 8A, a copper foil is used in this embodiment. Here, it is needless to say that a non-metallic good conductor can be used.

Although organic material made of an acrylic-based material or the like or a rubber-based material can be used as the pressure sensitive adhesive material 8B, an acrylic resin is used in this embodiment. Further, although a copper foil is used as the metal foil 8A in this embodiment, similar advantageous effects can be obtained with the use of aluminum foil. Further, as the conductive particles 8C which are mixed into the pressure sensitive adhesive material 8B, any one of particles made of copper, aluminum, nickel, or stainless steel can be used. In this embodiment, copper particles are used. The same goes for the following embodiments.

According to this embodiment, the electrical connection between the conductive particles 8C and the upper wiring electrode 6, the inter-substrate connection wiring electrode 7 and the metal foil 8A can be improved and the uniformity of the gap is ensured. In the conventional touch panel, since the above-mentioned lamination is performed by adhesion, when a displacement occurs between the upper wiring electrode 6 and the inter-substrate connection wiring electrode 7 due to application of an external force, it is difficult for them to return to an original position. However, according to this embodiment, since the means which laminates the first and second substrates, while ensuring an electric connection between them, is effected by pressure sensitive adhesion of the conductive pressure sensitive adhesive member 8, when an external force is applied to displace one of the upper and lower substrates from the other, this displacement causes both substrates to be displaced from each other and for an electrical connection to be established between the upper wiring electrode 6 and the inter-substrate connection wiring electrode 7, and the connection is maintained while they are held in the displaced condition. Then, when the external force is removed, the upper wiring electrode 6 and the inter-substrate connection wiring electrode 7 will return to their original positions.

Further, in a second example of the present embodiment, as the conductive particles 8C shown in FIG. 3, conductive particles which are formed by applying a metal plating made of nickel or gold on the surfaces of hard plastic particles, preferably made of PET (polyethylene telephthalate), are used.

When the conductive particles which are formed by applying a metal plating on the surfaces of plastic particles are used, at the time of laminating the upper substrate, which constitutes the first substrate, and the lower substrate, which constitutes the second substrate, and forming a gap between these substrates, the plastic particles are collapsed due to the pressing force used at the time of forming the gap. Accordingly, the contact areas of the conductive particles to the upper wiring electrode 6, the inter-substrate connection wiring electrode 7 and the metal foil 8A are increased; and, hence, the irregularities of the resistance values are reduced, whereby an advantageous effect is achieved in that the linearity of the resistance value detection can be made stable. Simultaneously, the displacement of the upper wiring electrode 6 and the inter-substrate connection wiring electrode 7 due to the application of an external force and the return of the upper wiring electrode 6 and the inter-substrate connection wiring electrode 7 to their original position can be obtained as in the case of the first example.

Figure 4:
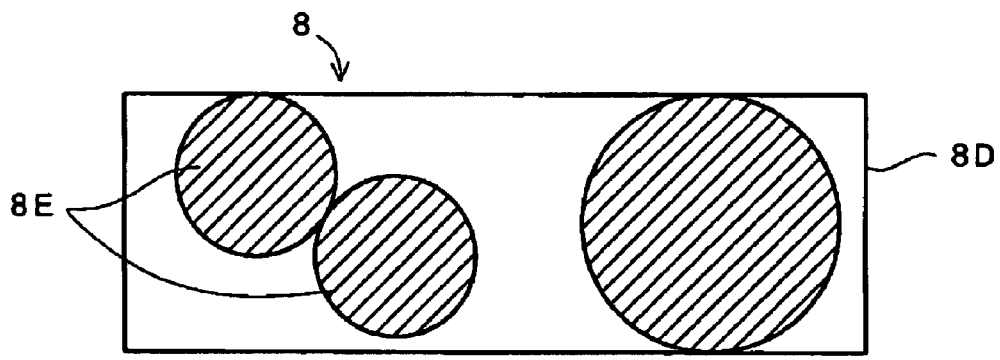
FIG. 4 is a schematic cross-sectional view showing a third example of a conductive pressure sensitive adhesive member formed in a seal region of the first embodiment of the present invention.

FIG. 4 is a schematic cross-sectional view showing a third example of the conductive pressure sensitive adhesive member formed in the seal region of the first embodiment of the present invention. With respect to this conductive pressure sensitive adhesive member 8, large-diameter conductive particles 8E are embedded in the pressure sensitive adhesive material 8D and these large-diameter conductive particles 8E control the gap defined between the upper and lower substrates in place of the metal foil in the above-mentioned example. As the conductive particles 8E, conductive particles which are made of metal, such as copper particles or the like, are formed by applying a metal plating made of gold, nickel or the like around large-diameter plastic particles, and those used in the above-mentioned example can be used in the same manner.

When the large-diameter metal particles are used, the metal particles are embedded into the upper wiring electrode 6 and the inter-substrate connection wiring electrode 7 coated on the inner surfaces of the upper and lower substrates due to the pressing force used at the time of forming the gap between the upper and lower substrates, so that the contact area thereof is increased, and, hence, the contact resistance becomes more uniform.

Further, when the metal particles are formed by applying a metal plating made of gold, nickel or the like around large-diameter plastic particles, the plastic particles collapse due to the pressing force at the time of forming the gap between the upper and lower substrates, so that the contact area thereof is also increased, and, hence, the contact resistance also becomes more uniform.

According to this example, the electric contact between the upper wiring electrode 6 and the inter-substrate connection wiring electrode 7 disposed between the upper and lower substrates is also enhanced so that the irregularities of the resistance value are reduced and an advantageous effect is achieved in that the linearity of the resistance value detection can be made stable. Further, the displacement between the upper wiring electrode 6 and the inter-substrate connection wiring electrode 7 due to application of an external force and the return to their original positions can be realized.

With the provision of a touch panel as described with reference to the above-mentioned first embodiment, the erroneous detection of the coordinates inputted through the screen can be prevented, so that it becomes possible to provide a screen input type display device which can realize a highly reliable screen inputting feature.

Figure 5:
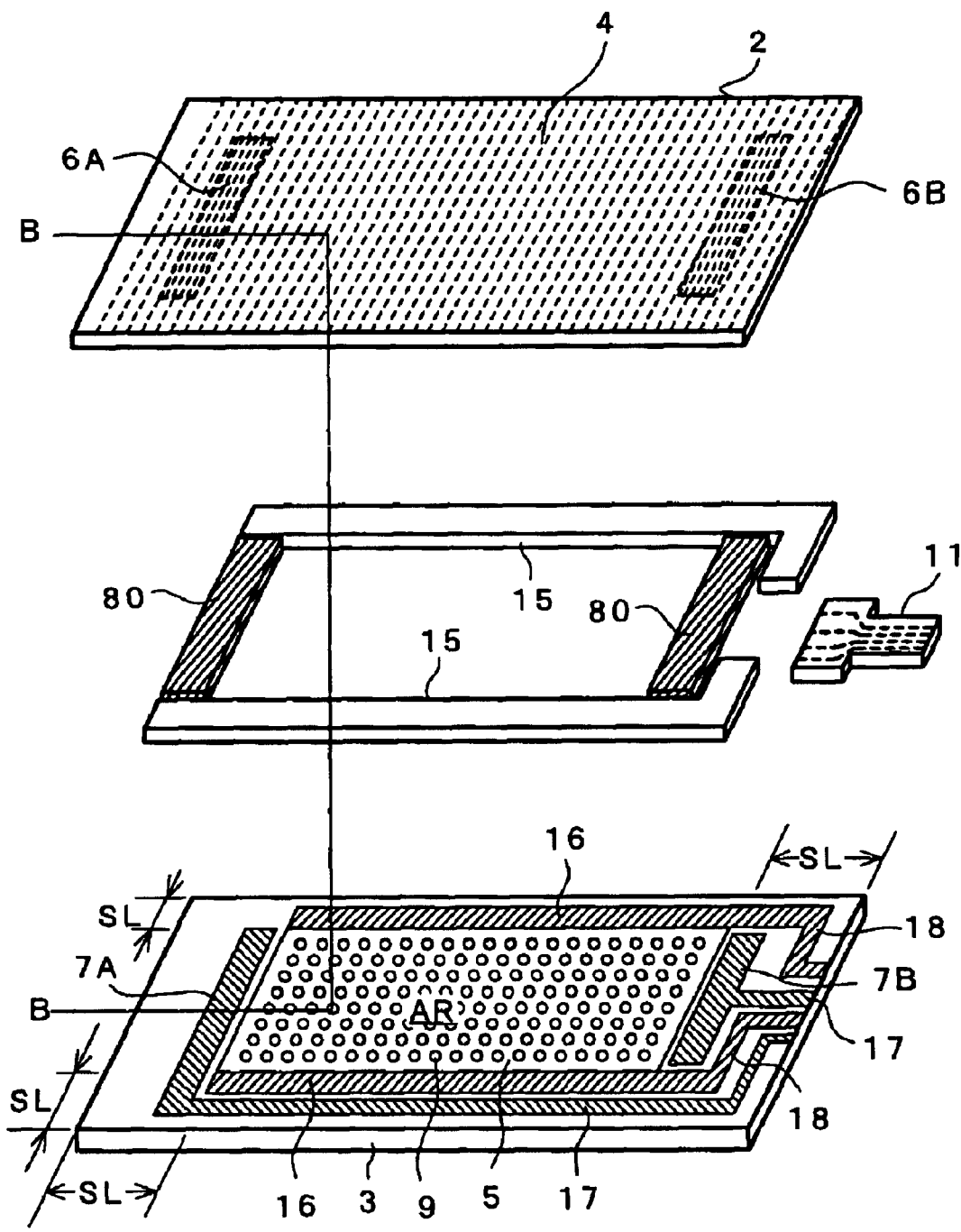
FIG. 5 is an exploded perspective view showing the overall constitution of a second embodiment of a touch panel which constitutes a screen input type display device according to the present invention.

FIG. 5 is an exploded perspective view showing the overall constitution of a second embodiment of a touch panel which constitutes a screen input type display device according to the present invention. In the drawing, numerals 6A, 6B indicate upper wiring electrodes, numerals 7A, 7B indicate inter-substrate connection wiring electrodes formed on the inner surfaces of the lower substrate 3, numeral 80 indicates conductive pressure sensitive adhesive members which electrically connect the wiring electrodes 6A, 6B of the upper substrate 2 and the inter-substrate connection wiring electrodes 7A, 7B at seal portions of the upper and lower substrates. Parts having the same numerals as those shown in FIG. 1 correspond to identical functional parts.

In this embodiment, an upper resistance film 4 is formed on the entire inner surface of the upper substrate 2, and the upper wiring electrodes 6A, 6B are formed on the upper resistance film 4 in the vicinity of both end portions thereof (left and right sides of FIG. 5). Pressure sensitive adhesive tapes 15 make the upper and lower substrates adhere to each other at portions other than portions corresponding to the conductive pressure sensitive adhesive members 80.

Although the pressure sensitive adhesive tapes 15 are indicated as L-shaped members in FIG. 5, it is preferable to cut a tape-like member into strips and to adhere them in view of the easiness of operation.

Although the lower wiring electrodes 16, the lower wiring electrode pull-around wirings 18 and the inter-substrate connection wiring electrode pull-around wirings 17 are insulated from the upper resistance film 4 by the pressure sensitive adhesive tapes 15, the insulation structure is not limited to the above, and insulation layers may be separately provided.

Since other structural features of this embodiment are identical with those of the first embodiment, which has been explained in conjunction with FIG. 1, a repeated explanation thereof will be is omitted.

Figure 6:
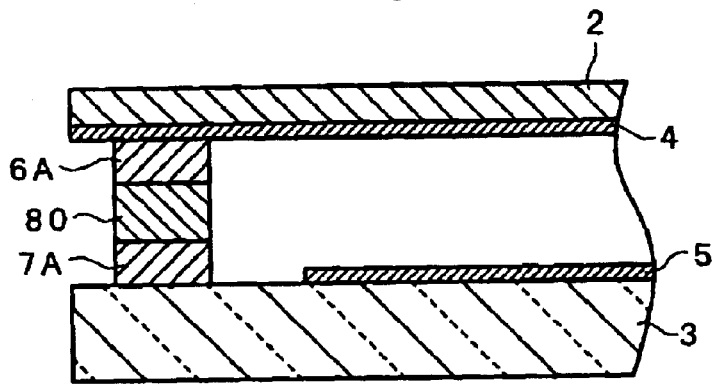
FIG. 6 is a schematic cross-sectional view of an essential part taken along a line B—B of FIG. 5 showing the constitution of a seal region of the second embodiment of the present invention in an enlarged form.

FIG. 6 is a schematic cross-sectional view of an essential part taken along a line B—B of FIG. 5 which shows the constitution of the seal region in the second embodiment of the present invention in an enlarged form. In this embodiment, the upper wiring electrode 6A formed on the upper resistance film 4 formed on the entire inner surface of the upper substrate 2 and the inter-substrate connection wiring electrode 7A formed on the seal region portion of the lower substrate 3 are electrically connected by a conductive pressure sensitive adhesive member 80. The above-mentioned wiring electrode 6A and inter-substrate connection wiring electrode 7A are formed by coating or printing the silver paste.

Here, a conductive pressure sensitive adhesive member 80, which is interposed between the upper wiring electrode 6B and the inter-substrate connection wiring electrode 7B, is formed in the same manner as the conductive pressure sensitive adhesive member 80, which is interposed between the upper wiring electrode 6A and the inter-substrate connection wiring electrode 7A. The same goes for constitutions which will be explained hereinafter.

Figure 7:
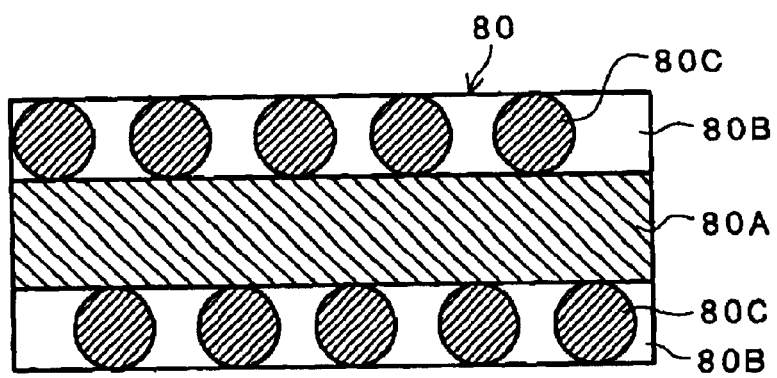
FIG. 7 is a cross-sectional view for schematically showing the structure of a first example of a conductive pressure sensitive adhesive member as used in FIG. 6.

FIG. 7 is a cross-sectional view schematically showing the structure of a first example of the conductive pressure sensitive adhesive member in the second embodiment of the present invention. In this example, the conductive pressure sensitive adhesive member is formed in a taped shape by forming acrylic-based pressure sensitive adhesive material 80B, in which conductive particles 80C are mixed, on both surfaces of the metal foil 80A. As the metal foil 80A, a copper foil or an aluminum foil may be used, or alternatively rubber-based pressure sensitive adhesive material may be used, in place of the acrylic-based pressure sensitive adhesive material.

Due to the constitution of this embodiment, the electric contact between the conductive particles 80C and the upper wiring electrode 6 (6A, 6B), the inter-substrate connection wiring electrode 7 (7A, 7B) and the metal foil 80A is increased, a uniformity of the gap is obtained, and the electric contact of the upper wiring electrode 6 and the inter-substrate connection wiring electrode 7 disposed between the upper and lower substrates is improved, so that the irregularities in the resistance values are reduced, whereby an advantageous effect is achieved in that the linearity of the resistance value detection can be made stable. Simultaneously, the displacement between the upper wiring electrode 6 and the inter-substrate connection wiring electrode 7 due to the external force and the return of the upper wiring electrode 6 and the inter-substrate connection wiring electrode 7 to their original positions can be obtained as in the case of the above-mentioned respective examples.

Figure 8:
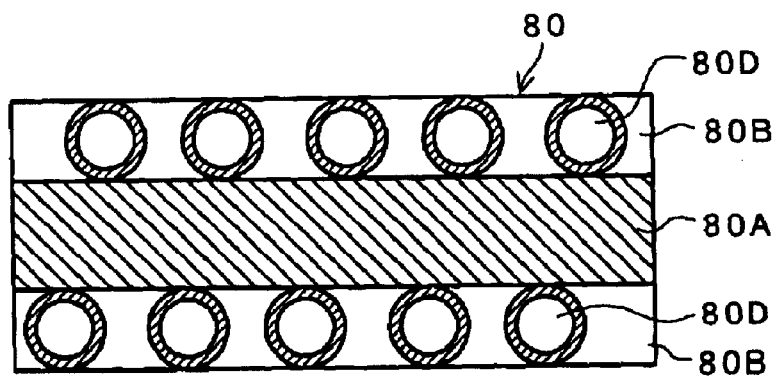
FIG. 8 is a cross-sectional view for schematically showing the structure of a second example of a conductive pressure sensitive adhesive member as used in FIG. 6.

FIG. 8 is a cross-sectional view for schematically showing the structure of a second example of the conductive pressure sensitive adhesive member in the second embodiment of the present invention. In this example, the conductive pressure sensitive adhesive member is formed in a taped shape by applying acrylic-based pressure sensitive adhesive material 80B, in which conductive particles 80D are mixed, to both surfaces of the metal foil 80A. Here, the conductive particles 80D are formed by applying a metal plating on surfaces of hard plastic particles which are preferably made of PET. As the conductive particles 80D, conductive particles to which the metal plating made of nickel or gold is applied can be used. Alternatively, rubber-based pressure sensitive adhesive material may be used in place of the acrylic-based pressure sensitive adhesive material.

Due to the constitution of this example, the electric contact between the conductive particles 80D and the upper wiring electrode 6 (6A, 6B), the inter-substrate connection wiring electrode 7 (7A, 7B) and the metal foil 80A is improved. Further, in the case where conductive particles formed by applying a metal plating on surfaces of plastic particles are used as the conductive particles 80D, when the upper and lower substrates 2, 3 are laminated to each other and a gap is formed between both substrates, collapsing of the plastic particles occurs due to the pressure applied at the time of forming the gap.

Accordingly, a uniformity of the gap is obtained, and the electric contact of the upper wiring electrode 6 and the inter-substrate connection wiring electrode 7 disposed between the upper and lower substrates is improved so that the irregularities of the resistance values are reduced, and an advantageous effect is obtained in that the linearity of the resistance value detection can be made stable. Further, the allowance or the displacement between the upper wiring electrode 6 and the inter-substrate connection wiring electrode 7 due to an external force, and the return of them to their original positions can be realized.

With the provision of a touch panel as described with reference to the above-mentioned second embodiment, erroneous detection of the coordinates inputted through the screen can be prevented, so that it becomes possible to provide a screen input type display device which can realize a highly reliable screen inputting function.

Figure 9:
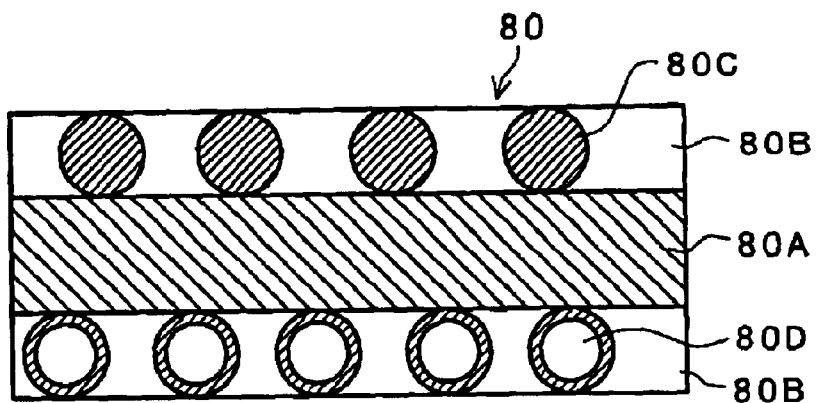
FIG. 9 is a cross-sectional view for schematically showing the structure of a third example of a conductive pressure sensitive adhesive member as used in FIG. 6.

FIG. 9 is a cross-sectional view schematically showing the structure of a third example of the conductive pressure sensitive adhesive member in the second embodiment of the present invention. In this example, the conductive pressure sensitive adhesive member 80 is formed in a taped shape by forming acrylic-based pressure sensitive adhesive material 80B, in which the conductive particles 80C are mixed, on the upper wiring electrode 6A side of the metal foil 80A, and by forming acrylic-based pressure sensitive adhesive material, in which conductive particles 80D, which are formed by applying a metal plating on surfaces of hard plastic particles preferably made of PET, on the inter-substrate connection wiring electrode 7A side of the metal foil 80A. As the metal foil, a copper foil or an aluminum foil can be used. Alternatively, rubber-based pressure sensitive adhesive material may be used in place of the acrylic-based pressure sensitive adhesive material.

With the use of a conductive pressure sensitive adhesive member 80 having the structure of this example, when the upper and lower substrates 2, 3 are laminated to each other and a gap is formed between both substrates, a collapsing of the plastic particles occurs due to the pressure applied at the time of forming the gap. Accordingly, the contact area of the conductive particles with the upper wiring electrode 6 (6A, 6B), the inter-substrate connection wiring electrode 7(7A, 7B) and the metal foil 80A is increased, so that the irregularities in the resistance values are reduced, and an advantageous effect is obtained in that the linearity of the resistance value detection can be made stable. Further, the displacement between the upper wiring electrode 6 and the inter-substrate connection wiring electrode 7 due to application of an external force and the return of them to their original positions can be realized as in the case of the previously-mentioned examples.

Figure 10:
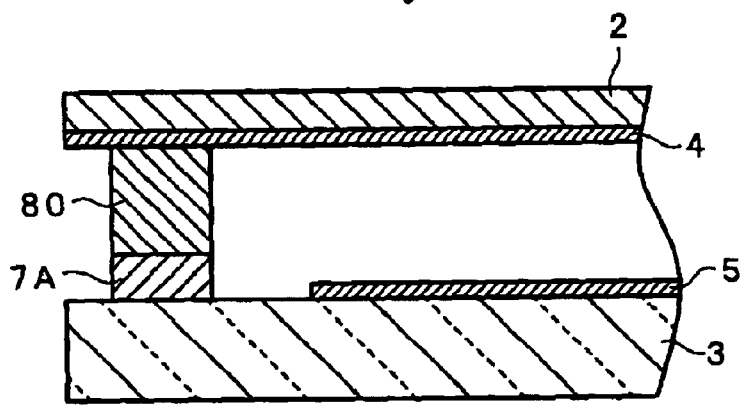
FIG. 10 is a schematic cross-sectional view for showing the constitution of an essential part of a third embodiment of the touch panel constituting the screen input type display device of the present invention.

FIG. 10 is a schematic cross-sectional view similar to FIG. 6 which shows the constitution of an essential part of a third embodiment of a touch panel which constitutes a screen input type display device according to the present invention. This embodiment is characterized by eliminating the upper wiring electrode 6 which is coated on the upper resistance film 4 formed on the inner surface of the upper substrate 2 from the constitution described in conjunction with FIG. 7, FIG. 8 and FIG. 9.

That is, in this embodiment, the conductive pressure sensitive material 80B, in which the conductive particles 80C or 80D of the conductive pressure sensitive adhesive member 80 which face the upper substrate in an opposed manner are mixed, is directly adhered to the upper resistance film 4.

According to this embodiment, in addition to the above-mentioned advantageous effects of the respective embodiments, a step for forming the upper wiring electrode becomes unnecessary, and, hence, a reduction of the cost can be achieved.

With the provision of a touch panel as described with reference to the above-mentioned third embodiment, the erroneous detection of the coordinates inputted through the screen can be prevented, so that it becomes possible to provide a screen input type display device which can realize a highly reliable screen inputting function.

Figure 11:
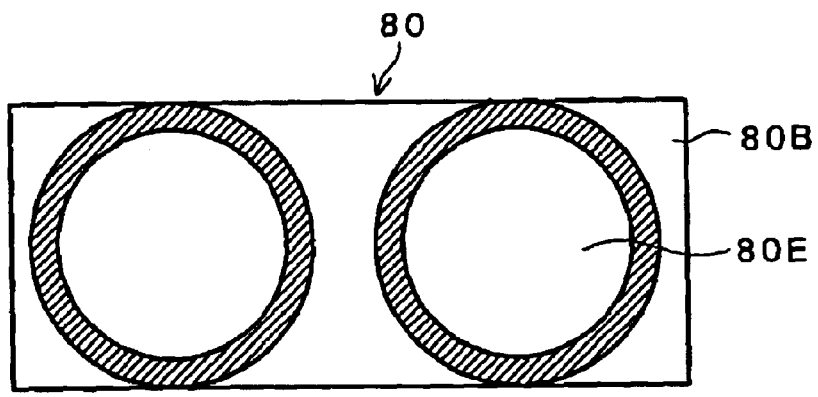
FIG. 11 is a schematic cross-sectional view similar to that of FIG. 6 for showing the constitution of a conductive pressure sensitive adhesive member of a fourth embodiment of the touch panel constituting the screen input type display device of the present invention.

FIG. 11 is a schematic cross-sectional view showing the constitution of a conductive pressure sensitive adhesive member in a fourth embodiment of a touch panel which constitutes the screen input type display device of the present invention. In this embodiment, a conductive pressure sensitive adhesive member 80 is formed by embedding large-diameter conductive particles 80E in pressure sensitive adhesive material 80B. As the conductive particles 80E, plastic particles in which a metal (gold, nickel or the like) plating is applied on surfaces thereof are used.

These large-diameter conductive particles 8E are provided for controlling the gap between the upper and lower substrates. By adhering the upper and lower substrates using this conductive pressure sensitive adhesive member 80, the gap between the upper and lower substrates can be controlled. When conductive particles in which plating made of metal, such as nickel or the like, is formed on the surfaces of large-diameter plastic particles are used, the plastic particles are collapsed by a pressing force applied at the time of forming the gap between the upper and lower substrates, and, hence, the contact area is increased and the contact resistance becomes more uniform.

In this embodiment also, the electric contact between the upper and lower substrates is enhanced so that an advantageous effect is obtained in that the irregularities in the resistance values are reduced, whereby the linearity of the resistance value detection can be made stable. Simultaneously, the displacement between the upper wiring electrode and the inter-substrate connection wiring electrode due to application of an external force and the return of them to their original positions can be realized as in the case of the previously-mentioned examples.

The large-diameter metal particles may be used in place of the conductive particles 80E, which are formed by applying a metal plating on surfaces of large-diameter plastic particles. In this case, the metal particles are embedded into the upper wiring electrode and the inter-substrate connection wiring electrode coated on the inner surfaces of the upper and lower substrates due to a pressing force applied at the time of forming the gap between the upper and lower substrates, so that the contact area thereof is increased, and, hence, the contact resistance becomes more uniform.

In this embodiment also, the electric contact between the upper and lower substrates is enhanced, so that an advantageous effect is obtained in that the irregularities of the resistance values are reduced, whereby the linearity of the resistance value detection can be made stable. Simultaneously, it becomes possible to obtain an advantageous effect in that the mechanical strength of the laminated upper and lower substrates can be enhanced.

With the provision of a touch panel as described with reference to the above-mentioned fourth embodiment, the erroneous operation of the coordinates inputted through the screen can be prevented so that it becomes possible to provide a screen input type display device which can realize a highly reliable screen inputting.

Figure 12:
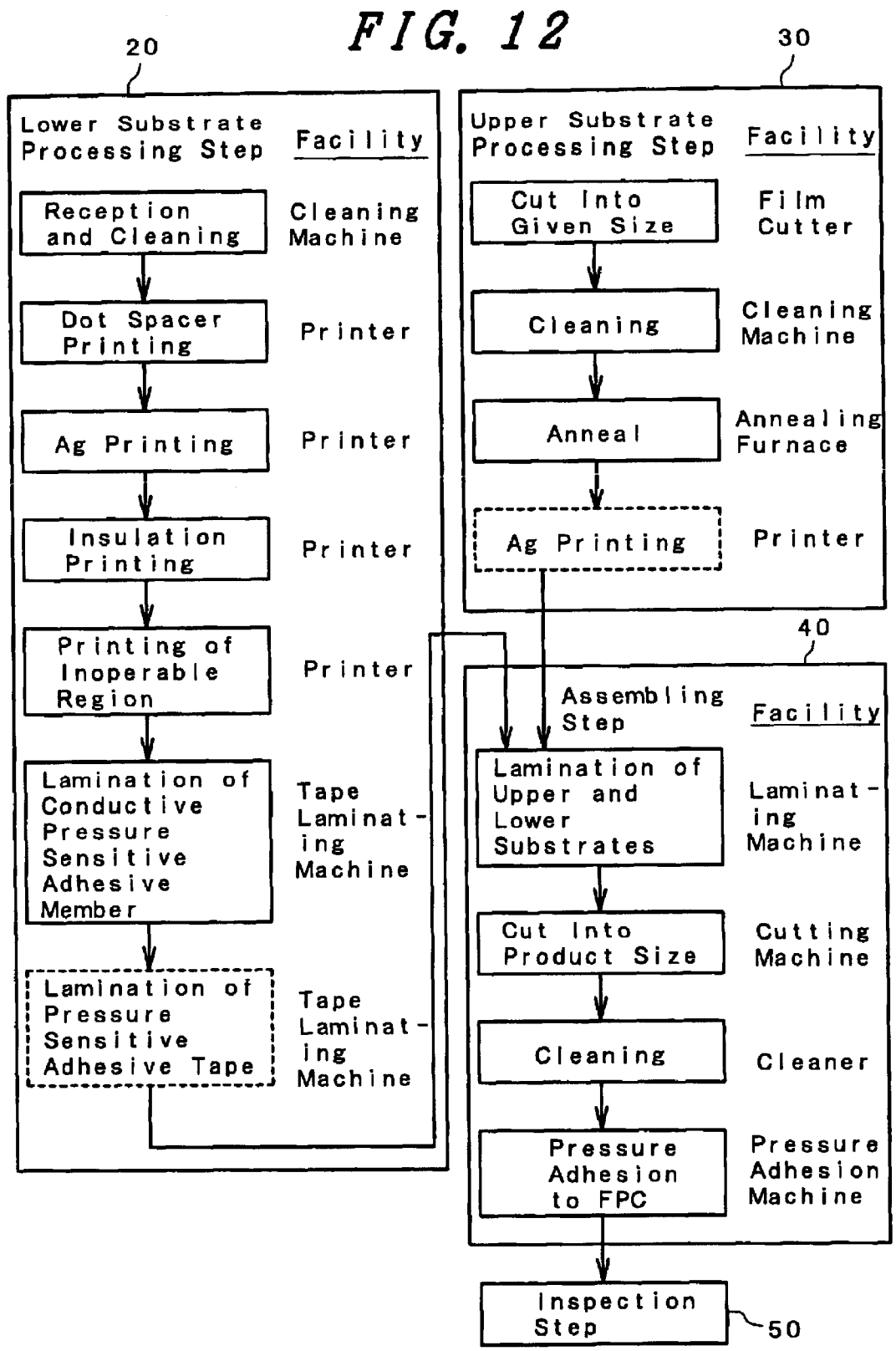
FIG. 12 is a flow diagram showing steps in the manufacture of a touch panel used in the screen input type display device of the present invention.

FIG. 12 is a flow chart of fabrication steps employed in the manufacture of the touch panel used in the screen input type display device of the present invention. In the drawing, numeral 20 indicates a lower substrate processing step, numeral 30 indicates an upper substrate processing step, numeral 40 indicates an assembling step, and numeral 50 indicates an inspection step.

In the lower substrate processing step 20, after cleaning a glass sheet on which an ITO film has been already formed as a lower resistance film using a cleaning machine, spacers (dot spacers in this step) are printed on the glass by means of a printing machine. A conductive paste made of silver (Ag) paste or the like is printed on both ends (see the above-mentioned embodiments) of the glass substrate so as to form inter-substrate connection wiring, lower wiring electrodes and pull-around wiring.

Thereafter, an inoperable region forming member (14 in FIG. 19A) is printed around an input region. Conductive pressure sensitive adhesive members are laminated using a tape laminating machine and then pressure sensitive adhesive tapes 15 are laminated, thus obtaining a lower substrate.

In processing an upper substrate, a received PET film provided with an ITO film as an upper resistance film is cut into a given size by a film cutter, and the cut films are cleaned and are subjected to an annealing treatment. Thereafter, a conductive paste, such as a silver paste or the like, is printed on the film to obtain the upper substrate. Here, with respect to the example as described with reference to the embodiment shown in FIG. 10, in which the conductive pressure sensitive adhesive members are directly adhered to the upper substrate, this silver paste printing step is omitted.

In the assembling step 40, the produced upper and lower substrates are laminated to each other using a laminating machine and are subjected to pressure sensitive adhesion while setting a given gap therebetween. After performing the pressure sensitive adhesion, the laminated substrates are cut into a product size using a cutting machine, and, as a final step, an FPC which constitutes a signal output terminal is adhered to the cut piece with pressure so as to complete a touch panel. The completed touch panel is transported to an inspection stage where the completed touch panel is checked with respect to given inspection items.

In the above-mentioned embodiments, although an explanation has been given with respect to a case in which the inter-substrate connection wiring electrodes and the pull-around wiring are formed on the lower substrate side, these elements may be formed on the opposite-side substrate, that is, the upper substrate side. Further, the electric connection of these components to the FPC may be performed at the upper substrate side. In this case, the pull-around wiring to the FPC and the inter-substrate wiring electrodes which connect the lower resistance film to the upper substrate may be formed on the upper substrate, and they may be electrically connected to each other using pressure sensitive tapes similar to those of the above-mentioned embodiment.

One embodiment of a screen input type display device according to the present invention, which incorporates the touch panel produced in the above-mentioned manner therein, will be explained in detail in conjunction with FIG. 13 to FIG. 17.

Figure 13:
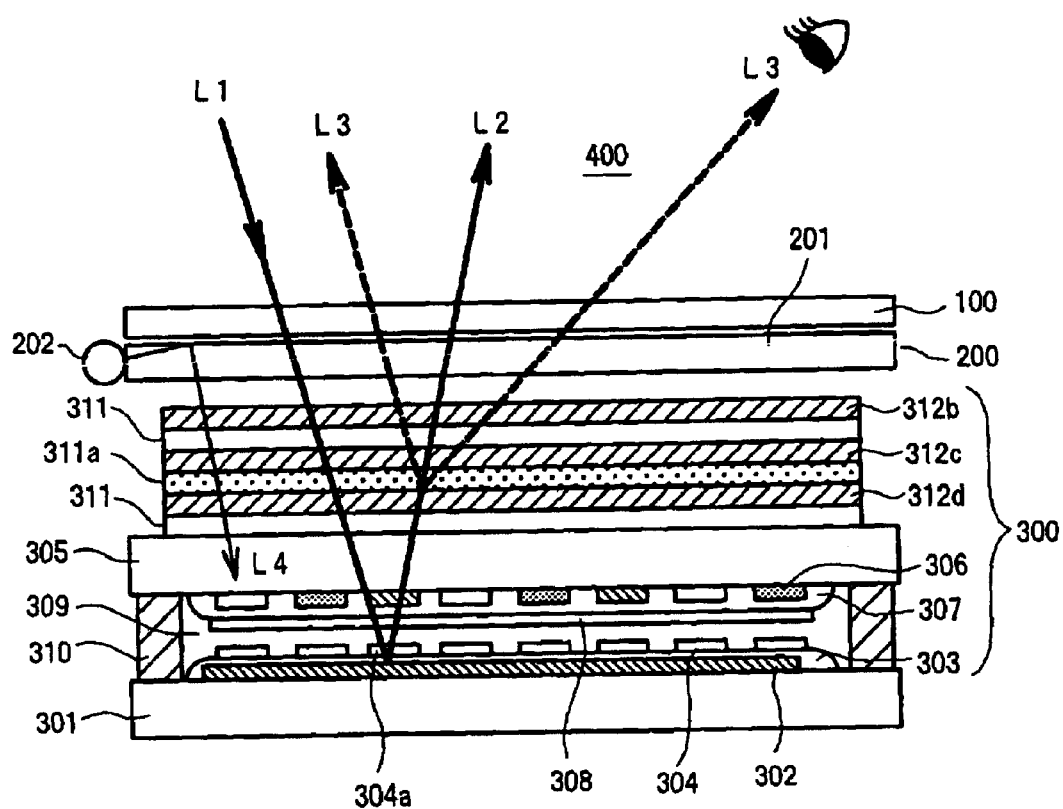
FIG. 13 is a cross-sectional view of one example of a screen input type display device of the present invention.

FIG. 13 is a cross-sectional view showing one embodiment using a liquid crystal display device as a screen input type display device of the present invention. In this embodiment, an auxiliary light source device 200, which includes a light guide body 201 and a linear lamp 202, and a touch panel 100 are mounted on a reflection type liquid crystal panel 300.

A reflection layer 302 made of an aluminum thin film, a protective film 303 made of a reflection prevention film, such as $SiO_2$ or the like, and a lower electrode (signal electrode) 304 made of a transparent conductive film, such as ITO or the like, are formed on an inner surface of a first substrate 301, which constitutes a lower substrate of the liquid crystal panel 300.

Further, on an inner surface of a second substrate 305, which constitutes an upper glass substrate, color filters 306 of three colors (R, G, B) are formed by doping dye or pigment into an organic resin film, a protective film 307 made of organic material is provided to prevent impurities from being mixed into a liquid crystal layer 309 from the color filters 306 and flatten an inner surface of the second substrate 305, and an upper electrode (scanning electrode) 308 made of a transparent conductive film such as ITO or the like is formed.

Here, grid-like or stripe-like light-shielding films (black matrix) are formed among respective colors R, G, B which constitute the color filters 306 when necessary, and the protective film 307 is formed on the light-shielding films.

A liquid crystal layer 309 made of a liquid crystal composite is inserted between the first and second substrates 301, 305 and is sealed by seal material 310 made of epoxy resin or the like, thus constituting a liquid crystal display panel.

On a surface of the second substrate 305 of the liquid crystal panel, a polarizer 312b, a first phase difference plate 312c and a second phase difference plate 312d are laminated. Between each two of the second substrate 305, the polarizer 312b, the first phase difference plate 312c and the second phase difference plate 312d, adhesive layers 311, 311a made of an adhesive agent (for example, epoxy-based or acrylic-based adhesive agent), pressure sensitive adhesive material or the like are formed so as to fixedly secure respective members.

Here, the adhesive agent is a bonding agent with which, even when two optical films 312 of various kinds which are once laminated are peeled off, such optical films 312 can be laminated to each other again. By fixing various optical films 312 and the liquid crystal panel using such an adhesive agent, when the optical film 312 and the liquid crystal panel are fixed erroneously, the optical films 312 and the liquid crystal panel are reproducible so that the yield of fabrication can be enhanced.

The reflection layer 302 may preferably have mirror reflection characteristics in view of the need for high reflectance. In this embodiment, an aluminum film is formed by a vapor deposition technique. A multi-layered film may be formed on the surface of the reflection layer 302 for enhancing the reflectance. Further, a protective film 303 is formed on the reflection layer 302 for the purpose of protecting the reflection layer 302 from erosion and of flattening the surface of the reflection layer 302.

Here, the reflection layer is not limited to an aluminum film and may be a metal film made of chromium or silver or a non-metallic film so long as the film has mirror reflection characteristics.

Further, the protective film 303 is not limited to an $SiO2$ film and may be any insulation film which can protect the reflection layer 302. That is, an inorganic film, such as a silicon nitride film or the like, an organic metal film, such as an organic titanium film or the like, or an organic film made of polyimide or epoxy resin or the like, may be used. Particularly, the organic film made of polyimide or epoxy resin or the like exhibits an excellent flatness, and, hence, a lower electrode 304 which is formed on the protective film 303 can be easily formed. Further, when an organic metal film, such as an organic titanium film or the like, is used as the protective film 303, it becomes possible to form the lower electrode 304 at a high temperature, so that the wiring resistance of the lower electrode 304 can be decreased.

Above the liquid crystal panel which mounts the multi-layered optical films 312, an illumination device, which includes a light guide body 201 and a light source 202, is disposed as an auxiliary illumination device 200, which is used when the external light is insufficient.

The light guide plate 201 is made of a transparent resin, such as acrylic resin, and a print patterning or a surface irregularity processing is applied to a viewer side surface (upper surface) of the light guide plate 201 to cause light L4 of the light source 202 to be irradiated toward the liquid crystal panel side.

Further, on the auxiliary illumination device 200, a touch panel 100 is mounted. In this touch panel 100, when the surface of the touch panel 100 is pushed with a rod-like body having a sharpened tip, such as a nib or a fingertip, the coordinates of a position corresponding to a pushed portion is detected and data signals to be transmitted to a host (550 in FIG. 17 which will be explained later) of an information processing device (547 in FIG. 17 which will also be explained later) are outputted.

The second substrate 305 of the liquid crystal panel 300, the light guide body 201 of the auxiliary light source device 200 and the touch panel 100 are fixedly secured to each other by a pressure sensitive adhesive double coated tape (for example, nonwoven fabric impregnated with a it pressure sensitive adhesive agent) or the like.

With the use of the pressure sensitive adhesive double coated tape, after the liquid crystal panel 300, the auxiliary light source device 200 and the touch panel 100 are laminated to each other, it is possible to peel them off, and, hence, even when the liquid crystal panel 300, the auxiliary illumination device 200 and the touch panel 100 are erroneously fixed, they can be reproduced.

This auxiliary illumination device 200 is not always necessary and is unnecessary in an environment which is always bright.

In this embodiment, the adhesive layer 311a, which is disposed between the first phase difference plate 312c and the second phase difference plate 312d, is provided with a light diffusion function. To be more specific, light diffusion material having a refractive index different from that of the adhesive agent is mixed in the adhesive agent. When an epoxy resin-based adhesive agent or an acrylic-based adhesive agent is used as the adhesive material, transparent organic particles made of polyethylene, polystyrene, divinylbenzene or transparent inorganic particles made of silica or the like can be used as the light diffusion material.

Here, as the adhesive material, pressure sensitive adhesive material having a refractive index different from that of the light diffusion material can be used. In this case, even when the first phase difference plate 312c and the second phase difference plate 312d are erroneously laminated to each other, it is possible to reproduce them.

With the use of the transparent organic particles or inorganic particles as the light diffusion material, the absorption in the visible light region can be reduced, and, hence, the reflectance and the spectral characteristics of the liquid crystal panel can be improved.

Further, when an organic-based material is used as the adhesive agent, by using the organic particles as the light diffusion material, the difference in the thermal expansion coefficient between them can be decreased so that the occurrence of cracks in the adhesive layer 311a can be prevented.

Although cracks are liable to occur in the adhesive layer by mixing the light diffusion material in the adhesive agent compared to the case which uses only the adhesive material, by inserting the adhesive layer 311a containing the light diffusion material therein between the first phase difference plate 312c and the second phase difference plate 312d having substantially the same thermal expansion coefficient, a problem in which cracks occur in the adhesive layer 311a can be obviated.

The principle operation of the screen input type display device shown in FIG. 13 will be explained. An incident light L1 which is incident on the liquid crystal display device 400 from various directions reaches the reflection layer 302 after passing the touch panel 100, the light guide plate 201 of the auxiliary illumination device 200, the polarizer 312b, the adhesive layer 311 which is provided for fixing the polarizer 312b to the first phase difference plate 312c, the first phase difference plate 312c, the adhesive layer 311a having a light diffusion function which is provided for fixing the first phase difference plate 312c to the second phase difference plate 312d, the second phase difference plate 312d, the adhesive layer 311 which is provided for fixing the second phase difference plate 312d to the second substrate 305, the second substrate 305, the color filters 306, the upper electrode 308, the liquid crystal layer 309 and a specified pixel electrode (or a specified signal electrode) 304a.

The external light L1, which has reached the reflection layer 302, is reflected so as to become reflection light L2, and the reflection light L2 reaches the adhesive layer 311a having a light diffusion function through a path inverse to the path of the incident light L1. The reflection light L2, which has entered the adhesive layer 311a, is scattered in various directions to generate scattering light L3.

The direct reflection light L2 and the scattering light L3 irradiated from the adhesive layer 311a are emitted to the outside of the liquid crystal display device 400 after passing through the first phase difference plate 312c, which compensates for the phase difference generated when the light passes through the liquid crystal layer 309 by making use of the birefringence effect, the adhesive layer 311, the polarizer 312b, the light guide plate 201 and the touch-panel 100.

The viewer can recognize the display controlled by the specified pixel 304a by observing the direct reflection light L2 emitted to the outside of the liquid crystal display device.

Figure 14:
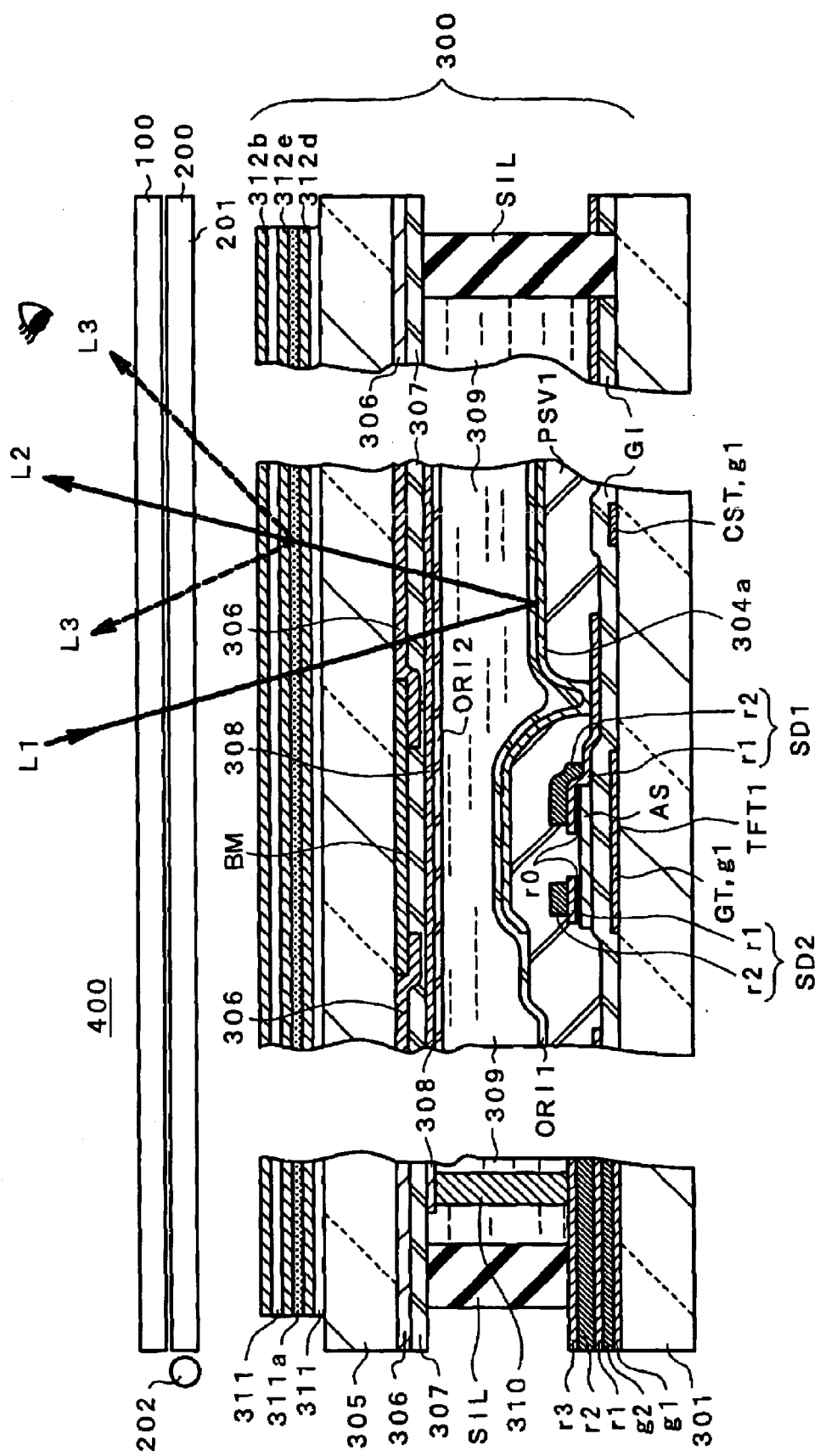
FIG. 14 is a cross-sectional view of another example of a screen input type display device of the present invention.

FIG. 14 is a cross-sectional view showing another embodiment of the screen input type display device of the present invention. Parts indicated by the same numeral in FIG. 13 corresponds to parts having identical functions. In this embodiment, an auxiliary light source device 200 similar to the device described in conjunction with FIG. 13 is laminated on the liquid crystal panel 300, and a touch panel 100 is mounted on the auxiliary light source device 200, thus constituting a screen input type liquid crystal display device 400.

The liquid crystal panel 300 is a thin film transistor (TFT) type liquid crystal panel which is a typical example of an active matrix type device. A plurality of pixels each of which has a thin film transistor TFT1 and a pixel electrode 304a are formed on the inside of a first substrate 301, which constitutes the liquid crystal panel 300.

Each pixel is arranged in a legion where two neighboring scanning signal lines and two neighboring video signal lines cross each other. The thin film transistor TFT1 is constituted of a first semiconductor layer (channel layer) AS, which is formed on the first substrate 301, a second semiconductor layer (semiconductor layer doped with impurity) r0 formed on the first semiconductor layer AS and a source electrode SD1 and a drain electrode SD2 formed on the second semiconductor layer r0. Here, although the source electrode SD1 and the drain electrode SD2 are respectively formed of a multi-layered film made of conductive films r1 and r2, the source electrode SD1 and the drain electrode SD2 may be formed of a single-layered film made of only the conductive film r1.

Although the relationship between the source electrode and the drain electrode becomes inverse depending on the manner of voltage application, that is, the electrode SD2 becomes the source electrode and the electrode SD1 becomes the drain electrode, the electrode SD1 is set as the source electrode and the electrode SD2 is set as the drain electrode in the following explanation for facilitating an understanding of the invention.

In the drawing, PSV1 indicates an insulation film (protective film) which protects the thin film transistor TFT1, numeral 304a indicates the pixel electrode, ORI1 and ORI2 respectively indicate orientation films for orienting a liquid crystal layer 309 which is brought into contact with the first substrate 301 side and a second substrate 305 side, and numeral 308 indicates an upper electrode (common electrode).

BM indicates a light shielding film which is also called a black matrix. The light shielding film BM has a function of enhancing the contrast by shielding light between neighboring pixel electrodes 304a. Numeral 310 indicates a conductive film which electrically connects the upper electrode 308 to a terminal (multi-layered metal conductive film made of g1, g2, r1, r2 and r3) formed on the first substrate 301.

In the thin film transistor TFT1, as in the case of an insulation-gate-type field-effect transistor, when a selective voltage is applied to a gate line voltage GT, the source electrode SD1 and the drain electrode SD2 are electrically connected, and, hence, the thin film transistor TFT1 functions as a switch.

The pixel electrode 304a is connected to the source electrode SD1, the video signal line is connected to the drain electrode SD2, and the scanning signal line is connected to the gate electrode GT. Depending on the selective voltage applied to the scanning signal line, the specified pixel electrode 304a is selected and a gradation voltage applied to the video signal line is supplied to the specified pixel electrode 304a. A CST formed of a conductive film g1 constitutes a capacity electrode and has a function of holding the gradation voltage to be supplied to the pixel electrode 304a by a next selection period.

This active matrix type liquid crystal panel 300 is provided with a switching element, such as a thin film transistor or the like, for each pixel, and, hence, a problem that crosstalk is generated between different pixels can be obviated and it is unnecessary to suppress the crosstalk by a special drive, such as a voltage equalization method, whereby a multi-gradation display can be realized. Further, the active matrix type liquid crystal panel 300 has other features, including a feature that the contrast is not decreased even when the number of scanning lines is increased.

In this embodiment, the pixel electrode 304a is constituted of a reflection metal film made of aluminum, chromium, titanium, tantalum, molybdenum or the like. Further, since the protection film PSV1 is disposed between the pixel electrode 304a and the thin film transistor TFT1, even when the pixel electrode 304a is made large and eventually is superposed on the thin film transistor TFT1, an erroneous operation can be prevented, whereby a liquid crystal panel having high reflectance can be realized.

Further, this liquid crystal panel is not provided with a first phase difference plate, which is used in the liquid crystal panel described with reference to FIG. 13, and, instead, is provided with a third phase difference plate 312e for improving the visual angle characteristics. This third phase difference plate 312e is also called a visual angle enlargement film, and it improves the angle dependency of the display characteristics of the liquid crystal panel by making use of the birefringence characteristics.

The third phase difference plate 312e can be constituted of an organic resin film made of polycarbonate, polyacrylate, polysulfone or the like, and, hence, by using a light diffusion adhesive layer 311a as an adhesive layer for fixing the third phase difference plate 312e to the second phase difference plate 312d, the occurrence of cracks in the light diffusion adhesive layer 311a can be prevented.

FIG. 15A to FIG. 15E are views as seen from five directions showing the outer appearance of a screen input type display device according to the present invention, wherein FIG. 15A is a front view as viewed from a display surface side, FIG. 15B is an upper side view, FIG. 15C is a lower side view, FIG. 15D is a left-side side view, and FIG. 15E is a right-side side view.

In FIG. 15A to FIG. 15E, numeral 318 indicates an upper case (shield case) constituted of a metal plate made of stainless steel, iron, aluminum or the like, and numeral 320 indicates a first opening which constitutes a display window formed on the upper case 310. Numeral 319 indicates a lower case constituted of a metal plate made of stainless steel, iron, aluminum or the like, or a plastic such as polycarbonate, ABS resin or the like.

Numeral 321 indicates pawls formed on the upper case 318, and numeral 322 indicates hooks formed on the lower case 319. The upper case 318 is connected to the lower case 319 by pressing the lower case 319 to the upper case to effect the engagement of the pawls 321 and the hooks 322.

Numeral 201 indicates a light guide plate made of transparent material, such as acrylic resin, glass or the like, and numeral 202 indicates a light source (lamp), such as a fluorescent lamp, a LED or the like. They constitute an auxiliary light source device 200 (here, a front light) which illuminates the liquid crystal panel 300 when an external light is insufficient. Numeral 100 indicates a touch panel for inputting data to be transmitted to a host (information processing part) connected to a liquid crystal display device 400.

Numeral 312 indicates optical films, such as a light diffusion layer, a polarizer, a phase difference plate and the like, which are formed on a display part of the liquid crystal display device 400. To make the entire thickness of the liquid crystal display device thin, these optical films are designed such that they are accommodated in a region of an opening of the upper case 318.

Figure 16A:
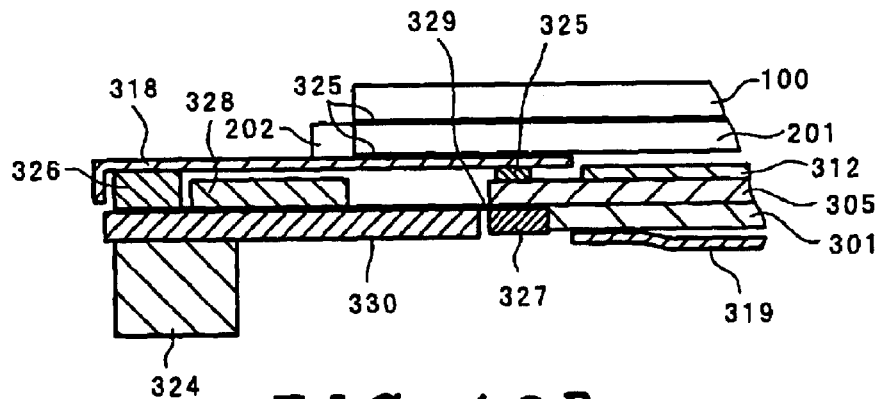
FIG. 16A–FIG. 16D are cross-sectional views taken along lines A—A, B—B, C—C and D—D, respectively, in FIG. 15A.
Figure 16B:
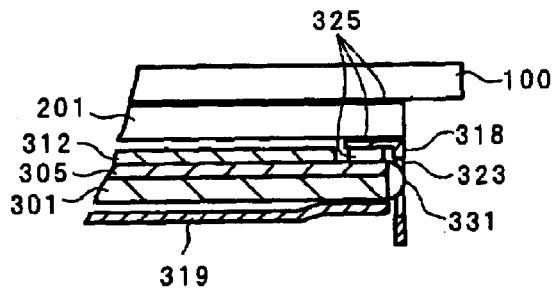
Figure 16C:
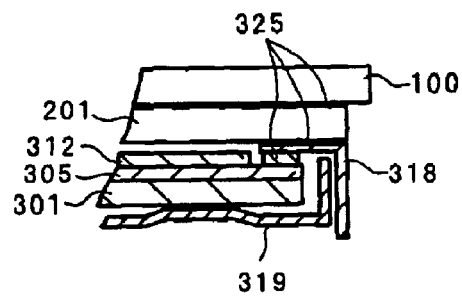
Figure 16D:
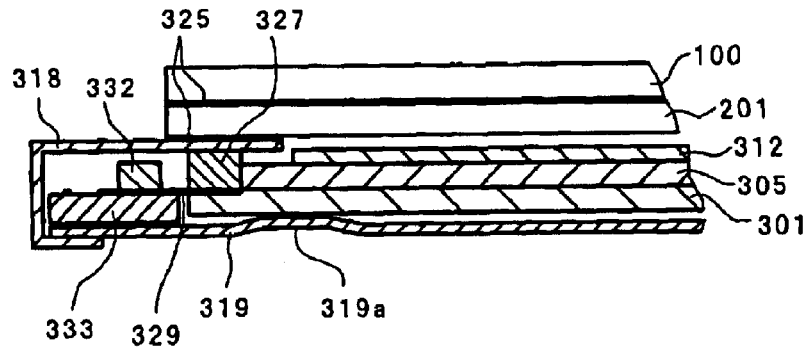
Figure 18:
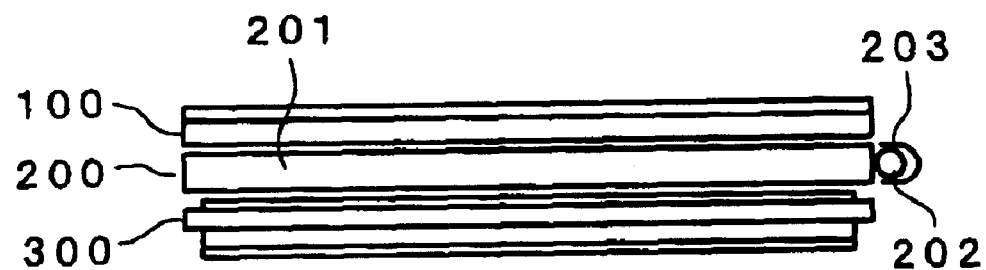
FIG. 18 is a schematic cross-sectional view showing an example of a screen input type display device which constitutes a display device having a touch panel.
Figure 20:
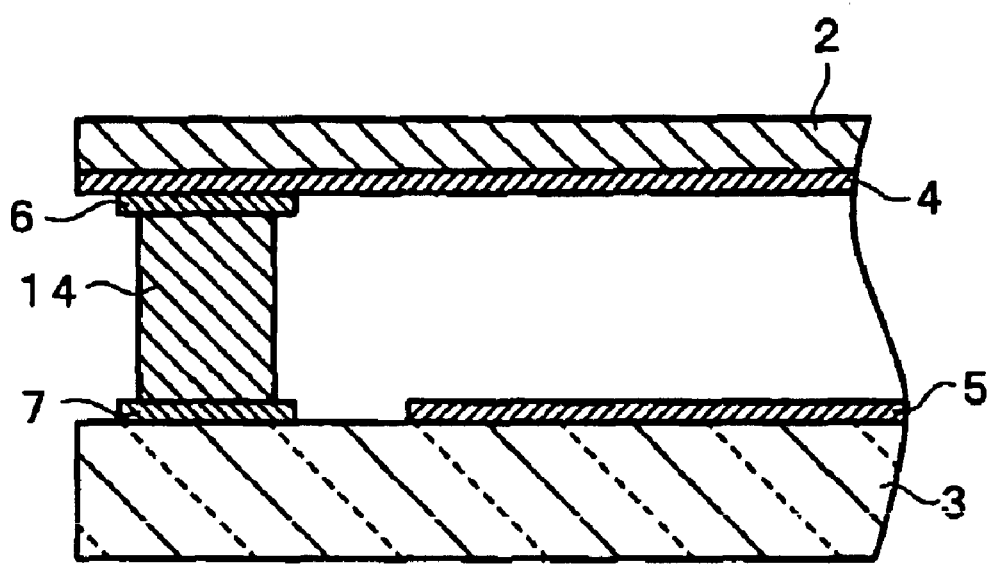
FIG. 20 is a schematic cross-sectional view showing an essential part of an upper and lower wiring connection portion of the touch panel shown in FIG. 19A and FIG. 19B.

FIG. 16A to FIG. 16D are cross-sectional views of FIG. 15A, wherein FIG. 16A is a cross-sectional view taken along a line A—A of FIG. 15A, FIG. 16B is a cross-sectional view taken along a line B—B of FIG. 15B, FIG. 16C is a cross-sectional view taken along a line C—C of FIG. 15C, and FIG. 16D is a cross-sectional view taken along a line D—D of FIG. 15D.

The liquid crystal panel is fabricated such that the first substrate 301 and the second substrate 305 are laminated to each other, the liquid crystal is injected in a gap formed by such lamination, and, thereafter, an injection opening is sealed by sealing material 331. An opening 323 is formed in a portion of the upper case 318 which corresponds to the sealing material 331, so that even when the sealing material is protruded, an expansion of the size of the contour of the liquid crystal panel can be prevented.

On the peripheries of the first substrate 301 and the second substrate 305, a printed circuit board (scanning line drive PCB) 330 for driving scanning lines which mounts a scanning line drive IC chip 328, is arranged. The printed circuit board 330 is connected to the liquid crystal panel through a flexible printed circuit board 329.

Further, on the peripheries of the first substrate 301 and the second substrate 305, a printed circuit board (signal line drive PCB) 333 for driving signal lines, which has a flexible printed circuit board 329, mounts a signal line drive IC chip 332 and is connected to the liquid crystal panel, is arranged.

Various signals and voltages for display are supplied to the scanning line drive PCB 330 and the signal line drive PCB 333 from an external circuit (host) through an interface connector 324. Here, although an interface connector 324 is provided to the scanning line drive PCB 330, the interface connector 324 may be formed on the signal line drive PCB 333.

Numeral 326 indicates a spacer for fixing the scanning line drive PCB 330 and numeral 327 indicates a spacer for pressing connection portions which connect the scanning line drive PCB 330 and the signal line drive PCB 333 to the liquid crystal panel. These spacers are constituted of insulation resilient material, such as rubber or the like.

Numeral 325 indicates a pressure sensitive adhesive double coated tape, and a non-woven fabric impregnated with epoxy-based adhesive agent can be used as such a tape 325, for example. With the use of the pressure sensitive adhesive double coated tape 325, the upper case 318 is fixed to the liquid crystal panel, the upper case of the liquid crystal panel is fixed to the light guide plate 201 of the auxiliary light source device 200, and the light guide plate 201 of the auxiliary light source device 200 is fixed to the touch panel 100.

In this manner, by fixing the liquid crystal panel, the auxiliary light source device 200 and the touch panel 100 using the pressure sensitive adhesive double coated tape 325, the assembling operation can be simplified and the reproduction after erroneous assembling is facilitated, so that the fabrication yield can be enhanced.

An inwardly protruding portion 319a is formed on the lower case 319 which provides an integration of the liquid crystal panel together with the upper case 318. This protruding portion 319a resiliently holds the liquid crystal panel.

FIG. 17 is a perspective view of one example of an information processing device which uses the screen input type display device of the present invention. This image processing device is also called a so-called "portable information terminal" and is constituted of a body part 547 and a display part 548. The body part 547 includes a keyboard 549, a host (information processing part) 550 having a microcomputer 551 and a battery 552.

The above-mentioned push input type liquid crystal display device 406 is mounted on the display part 548 and characters or devices 558 are inputted on the touch panel exposed at the display part, or icons 559 displayed on the display part are selected using a pen 556 accommodated in a pen accommodating part 557.

Further, an inverter power source 554 is mounted on the display part 548 for supplying lighting power to the auxiliary light source device through a cable 555.

Signals and voltages for display from the main part are supplied to an interface connector 324 of the above-mentioned liquid crystal panel which constitutes the liquid crystal display device 400 mounted on the display part 548 through an interface cable 553.

Further, this information processing device can be connected to a portable telephone 560 through a cable 561 so that communication can be performed by connecting the information processing device to an information communication network, such as the Internet.

In this manner, with the use of the screen input type display device of the present invention, the information processing device can be miniaturized and made light-weight, so that the availability of the device can be enhanced.

The shape and the structure of this type of portable information terminal are not limited to those described and shown in the drawing, and a portable information terminals having versatile shapes, structures and functions can be considered.

As has been described heretofore, according to the present invention, it becomes possible to provide a highly reliable image input type display device having a touch panel which can eliminate erroneous operation for detection of coordinates by stabilizing the linearity of the resistance value detection of the resist films.

What is claimed is:

1. A screen input type display device which arranges a touch panel on a display surface of a display device, the touch panel comprising:

a first substrate having a first resistance film, a second substrate having a second resistance film, an inter-substrate connection wiring electrode being formed on the second substrate, and a conductive pressure sensitive adhesive member being disposed between the first resistance film and the inter-substrate connection wiring electrode, the conductive pressure sensitive adhesive member electrically connecting the first resistance film and the inter-substrate connection wiring electrode, and the conductive pressure sensitive adhesive member having pressure sensitive adhesive material in which conductive particles are mixed formed on both surfaces of a metal foil for laminating the first substrate and the second substrate.

2. A screen input type display device according to claim 1, wherein the first resistance film and the conductive pressure sensitive adhesive member are directly brought into contact with each other.

3. A screen input type display device according to claim 1, wherein a first wiring electrode formed on the first resistance film is interposed between the first resistance film and the conductive pressure sensitive adhesive member.

4. A screen input type display device according to claim 1, wherein the metal foil is a copper foil.

5. A screen input type display device according to claim 1, wherein the conductive particles are metal particles.

6. A screen input type display device according to claim 1, wherein the conductive particles are plastic particles to which a conductive metal plating is applied or glass particles to which a conductive metal plating is applied.

7. A screen input type display device according to claim 1, wherein the conductive particles at the first substrate side of the metal foil and the conductive particles at the second substrate side of the metal foil are different in kind from each other.

8. A screen input type display device according to claim 1, wherein the first substrate is formed of a soft film member and the second substrate is formed of a hard plate.

9. A screen input type display device according to claim 1, wherein one of the first substrate and the second substrate is formed of a soft film member and the other is formed of a hard plate, the conductive particles at the hard plate side of the metal foil are formed of plastic particles to which a conductive metal plating is applied and the conductive particles at the soft film member side of the metal foil are formed of metal particles.

10. A screen input type display device which arranges a touch panel on a display surface of a display device, the touch panel comprising:

a first substrate having a first resistance film, a second substrate having a second resistance film, an inter-substrate connection wiring electrode being formed on the second substrate, and a conductive pressure sensitive adhesive member being disposed between the first resistance film and the inter-substrate connection wiring electrode, the conductive pressure sensitive adhesive member electrically connecting the first resistance film and the inter-substrate connection wiring electrode, and the conductive pressure sensitive adhesive member having pressure sensitive adhesive material in which plastic particles to which a conductive metal plating is applied are mixed for laminating the first substrate and the second substrate.

11. A screen input type display device according to claim 10, wherein the first resistance film and the conductive pressure sensitive adhesive member are directly brought into contact with each other.

12. A screen input type display device according to claim 10, wherein a first wiring electrode formed on the first resistance film is interposed between the first resistance film and the conductive pressure sensitive adhesive member.

13. An electronic system having a touch panel on a display surface of a display device, the touch panel comprising:

a first substrate having a first resistance film, a second substrate having a second resistance film, an inter-substrate connection wiring electrode being formed on the second substrate, and a conductive pressure sensitive adhesive member being disposed between the first resistance film and the inter-substrate connection wiring electrode, the conductive pressure sensitive adhesive member electrically connecting the first resistance film and the inter-substrate connection wiring electrode, and the conductive pressure sensitive adhesive member having pressure sensitive adhesive material in which conductive particles are mixed formed on both surfaces of a metal foil for laminating the first substrate and the second substrate.

14. An electronic system according to claim 13, wherein the first resistance film and the conductive pressure sensitive adhesive member are directly brought into contact with each other.

15. An electronic system according to claim 13, wherein a first wiring electrode formed on the first resistance film is interposed between the first resistance film and the conductive pressure sensitive adhesive member.

16. An electronic system according to claim 13, wherein the metal foil is a copper foil.

17. An electronic system according to claim 13, wherein the conductive particles are at least one of: metal particles; plastic particles to which a conductive metal plating is applied; and, glass particles to which a conductive metal plating is applied.

18. An electronic system according to claim 13, wherein the conductive particles at the first substrate side of the metal foil and the conductive particles at the second substrate side of the metal foil are different in kind from each other.

19. An electronic system according to claim 13, wherein the first substrate is formed of a soft film member and the second substrate is formed of a hard plate.

20. An electronic system according to claim 13, wherein one of the first substrate and the second substrate is formed of a soft film member and the other is formed of a hard plate, the conductive particles at the hard plate side of the metal foil are formed of plastic particles to which a conductive metal plating is applied and the conductive particles at the soft film member side of the metal foil are formed of metal particles.

* * * * *